US009699191B1

(12) United States Patent
Sokolov et al.

(10) Patent No.: US 9,699,191 B1
(45) Date of Patent: Jul. 4, 2017

(54) SYSTEMS AND METHODS FOR CONTROLLING CONTENT FOR CHILD BROWSER USERS

(71) Applicant: Symantec Corporation, Mountain View, CA (US)

(72) Inventors: Ilya Sokolov, Boston, MA (US); Kevin Jiang, Waltham, MA (US)

(73) Assignee: Symantec Corporation, Mountain View, CA (US)

( * ) Notice: Subject to any disclaimer, the term of this patent is extended or adjusted under 35 U.S.C. 154(b) by 154 days.

(21) Appl. No.: 14/689,074

(22) Filed: Apr. 17, 2015

(51) Int. Cl.
| G06F 15/16 | (2006.01) |
| H04L 29/06 | (2006.01) |
| H04L 29/08 | (2006.01) |
| G06N 7/00 | (2006.01) |
| G06F 21/30 | (2013.01) |
| G06F 21/60 | (2013.01) |

(52) U.S. Cl.
CPC .............. H04L 63/10 (2013.01); G06F 21/30 (2013.01); G06F 21/60 (2013.01); G06N 7/005 (2013.01); H04L 67/10 (2013.01)

(58) Field of Classification Search
CPC ......... H04L 63/08; H04L 63/10; H04L 63/20; H04L 29/06; H04L 63/0428
USPC .......................................................... 726/3
See application file for complete search history.

(56) References Cited

U.S. PATENT DOCUMENTS

| 6,745,367 B1 * | 6/2004 | Bates | G06F 17/30867 707/E17.109 |
| 8,095,672 B1 * | 1/2012 | Newstadt | G06F 21/40 705/75 |
| 8,296,255 B1 * | 10/2012 | Wawda | G06F 17/30876 706/48 |

OTHER PUBLICATIONS

"Norton Family", https://onlinefamily.norton.com/familysafety/loginStart.fs, as accessed Feb. 17, 2015, Symantec Corporation, (Feb. 11, 2009).
Akhter, "10 Free Parental Control Plugins for Chrome and Firefox", http://www.smashingapps.com/2014/02/05/10-free-parental-control-plugins-forchrome-and-firefox.html, as accessed Feb. 17, 2015, SmashingApps.com, (Feb. 5, 2014).
"Amazon FreeTime Unlimited", http://www.amazon.com/gp/feature.html?&docId=1000863021, as accessed Feb. 17, 2015, Amazon.com, Inc., (Dec. 8, 2012).
"Detecting installed plugins under different browsers?", http://stackoverflow.com/questions/5188908/detecting-installed-plugins-under-different-browsers, as accessed Feb. 17, 2015, Stack Overflow, (Mar. 4, 2011).

* cited by examiner

Primary Examiner — Baotran N To
(74) Attorney, Agent, or Firm — FisherBroyles LLP

(57) ABSTRACT

The disclosed computer-implemented method for controlling content for child browser users may include (1) identifying one or more indicators that a browser session user is a child, (2) calculating a session score indicating a likelihood that the browser session user is a child, (3) determining, based at least in part on the session score being above a threshold, that the browser session user is a child and (Continued)

therefore content controls should apply to a browser session of the child, and (4) initiating one or more content control actions. Various other methods, systems, and computer-readable media are also disclosed.

20 Claims, 6 Drawing Sheets

SYSTEMS AND METHODS FOR CONTROLLING CONTENT FOR CHILD BROWSER USERS

BACKGROUND

A significant trend in recent years has been the migration of data and services to cloud-based systems. In addition to storing personal and business data, cloud services provide news and information, entertainment, educational services, messaging, shopping, social networking, and focal points for a wide variety of business, non-profit, and personal interest organizations. This variety of information and services naturally attracts children, and children can benefit greatly from many cloud-based services. Parents, however, may want to restrict the types of information their children may access.

Parents have attempted to use various means of controlling the information and other resources cloud services make available to their children. One approach to controlling content available to a child is block all or some of the resources provided by a cloud service. However, blocking cloud service resources may prevent a child from accessing content appropriate for the child. Some existing technologies attempt to partially block resources provided by cloud services. However, partially blocking a cloud service's resources may cause other resources to malfunction or become unusable. Some services enable parents to create child accounts that restrict a child's access to a specific set of resources, but children may be able to circumvent the restrictions by creating a new account or by using someone else's account. Accordingly, the instant disclosure identifies and addresses a need for additional and improved systems for controlling content for child browser users.

SUMMARY

As will be described in greater detail below, the instant disclosure describes various systems and methods for controlling content for child browser users by identifying indicators that a browser user is a child. If the set of indicators suggest that the user is likely a child, systems and methods described herein may initiate content control actions that may prevent the child from accessing inappropriate content.

In one example, a computer-implemented method for controlling content for child browser users may include (1) identifying one or more indicators that a browser session user is a child, (2) based on the indicator indicating that the browser session user is a child, calculating a session score indicating a likelihood that the browser session user is a child, (3) determining, based at least in part on the session score being above a threshold, that the browser session user is a child and therefore content controls should apply to the child's browser session, and (4) based on the determination that content controls should apply to the browser session, initiating one or more content control actions. In one embodiment, the computing device that performs the portion of the computer-implemented method may include a server of a content service. In one embodiment, the computing device that performs the portion of the computer-implemented method may include a proxy server that relays communications between one or more clients and a server of a content service.

In some examples, identifying the indicator that the browser session user is a child may include identifying one or more changes to a request sent to a backend server when compared to a request received by the backend server. In some examples, identifying the indicator that the browser session user is a child may include (1) comparing a time to transmit a first form with a time to transmit a second form that includes the same quantity of data as the first form, where the first form includes more user interface elements than the second form, (2) determining that the time to transmit the first form is greater than the time to transmit the second form, and (3) in response to determining that the time to transmit the first form is greater than the time to transmit the second form, determining that a content monitor that parses the first and second forms is likely present.

In some examples, identifying the indicator that the browser session user is a child may include identifying a presence of one or more parental control extensions in a browser used in the browser session. In some examples, identifying the indicator that the browser session user is a child may include (1) rendering content during the browser session in a manner invisible to the browser session user, (2) detecting one or more changes to the rendered content, and (3) in response to detecting the change, determining that a parental control is likely controlling content rendered during the browser session.

In one embodiment, the change to rendered content may include removal of an offensive word and/or blocking content requested from a domain known to contain adult content. In one embodiment, the content control action may include modifying terms in search requests received during the browser session and/or modifying content delivered during the browser session.

In one embodiment, a system for implementing the above-described method may include several modules stored in memory, such as (1) an identification module that identifies one or more indicators that a browser session user is a child, (2) a scoring module that, based on the indicator indicating that the browser session user is a child, calculates a session score indicating a likelihood that the browser session user is a child, (3) an evaluation module that determines, based at least in part on the session score being above a threshold, that the browser session user is a child and therefore content controls should apply to a browser session of the child, and (4) a content control module that, based on the determination that content controls should apply to the browser session, initiates one or more content control actions. The system may also include one or more physical processors configured to execute the identification module, the scoring module, the evaluation module, and/or the content control module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify one or more indicators that a browser session user is a child, (2) calculate, based on the indicator indicating that the browser session user is a child, a session score indicating a likelihood that the browser session user is a child, (3) determine, based at least in part on the session score being above a threshold, that the browser session user is a child and therefore content controls should apply to a browser session of the child, and (4) based on the determination that content controls should apply to the browser session, initiate one or more content control actions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
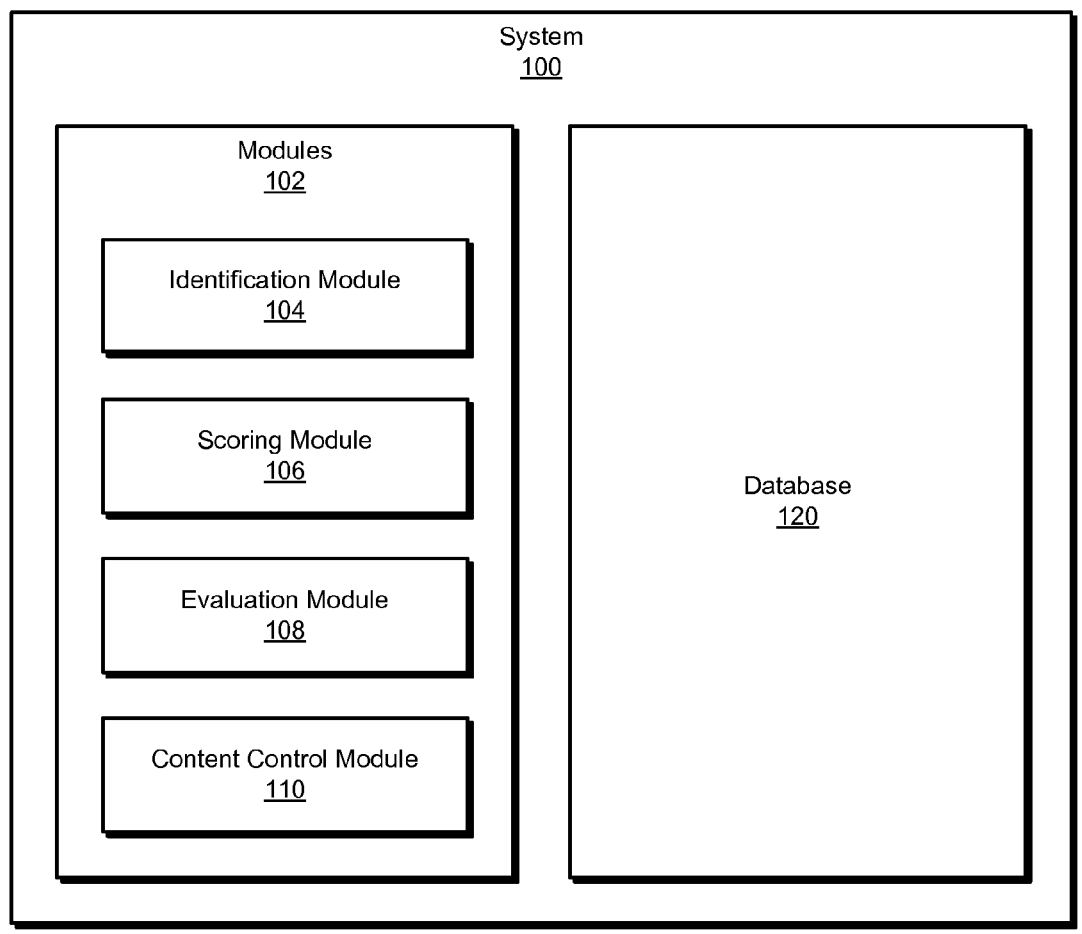
FIG. 1 is a block diagram of an exemplary system for controlling content for child browser users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for controlling content for child browser users. As will be explained in greater detail below, systems and methods described herein may determine that a browser user may be a child by identifying one or more of a variety of factors that indicate that the browser user is a child. After identifying these factors, systems and methods described herein may evaluate the factors to determine the likelihood that the browser user is a child. Upon determining that the browser user is likely a child and therefore that content controls should be applied to the browser session, systems and methods described herein may initiate one or more content control actions. Embodiments of the instant disclosure may be implemented on a server (e.g., as part of a cloud service or proxy server that routes communications between a user and a cloud service) remote from a device of the browser session and may determine the likelihood that a browser user is a child without the assistance of agent software running on the device on which the browser is executing.

The systems and methods described herein may provide various features and advantages over previous solutions. For example, the systems of the instant disclosure may enable content providers and security companies to provide parental controls without requiring installation of an agent on a client device that is accessing content. Thus, parental controls may be enforced across a variety of devices (e.g., laptops, desktops, tablets, gaming consoles, etc.) without the expense and effort involved in configuring parental controls separately on each of the devices. Furthermore, the systems of the instant disclosure may be able to provide parental controls on devices for which parental control software agents are not available and/or may supplement parental control software installed on devices. Accordingly, embodiments of the instant disclosure may provide, among other advantages, more effective and efficient systems for protecting children from inappropriate content.

Figure 2:
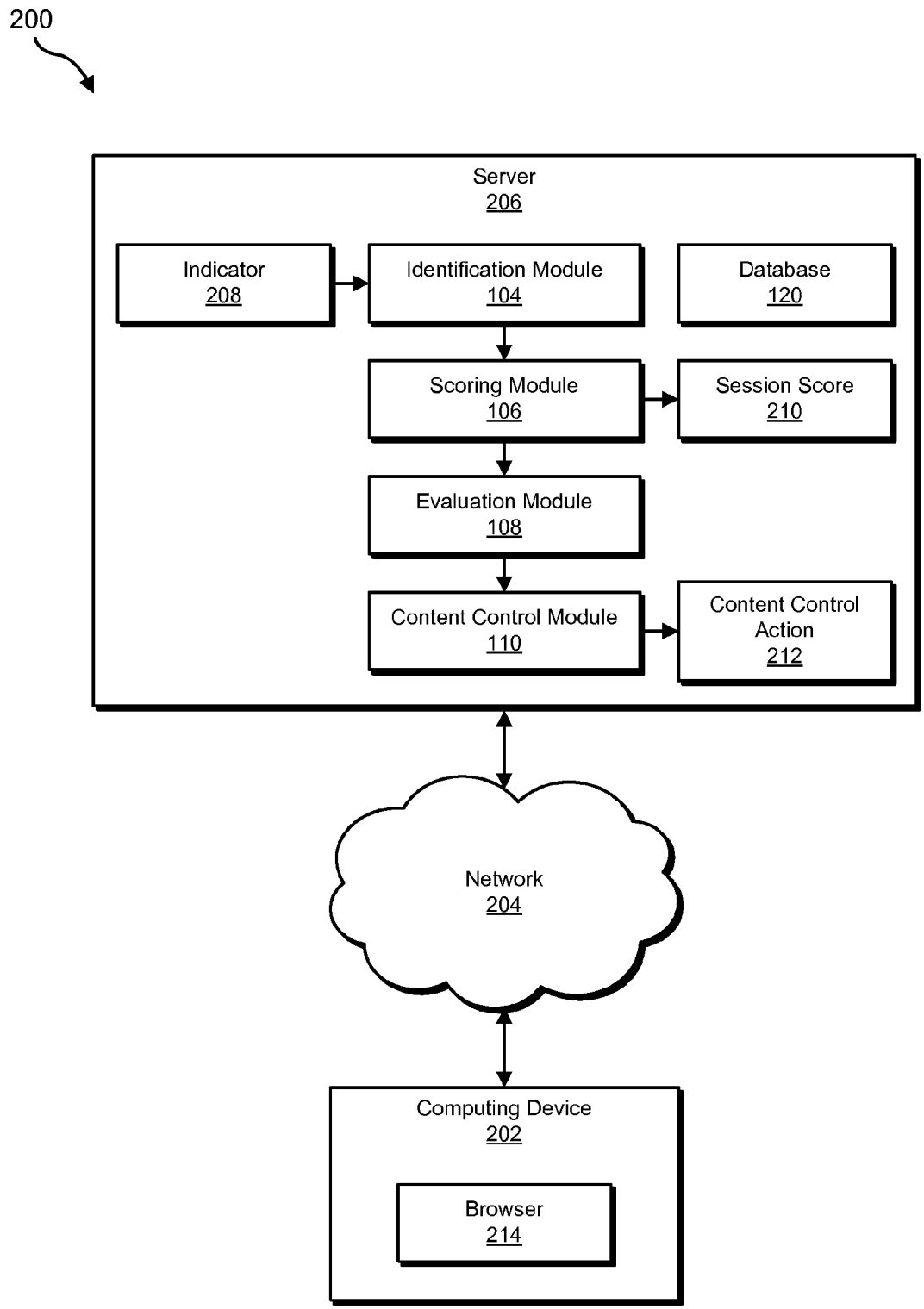
FIG. 2 is a block diagram of an additional exemplary system for controlling content for child browser users.
Figure 3:
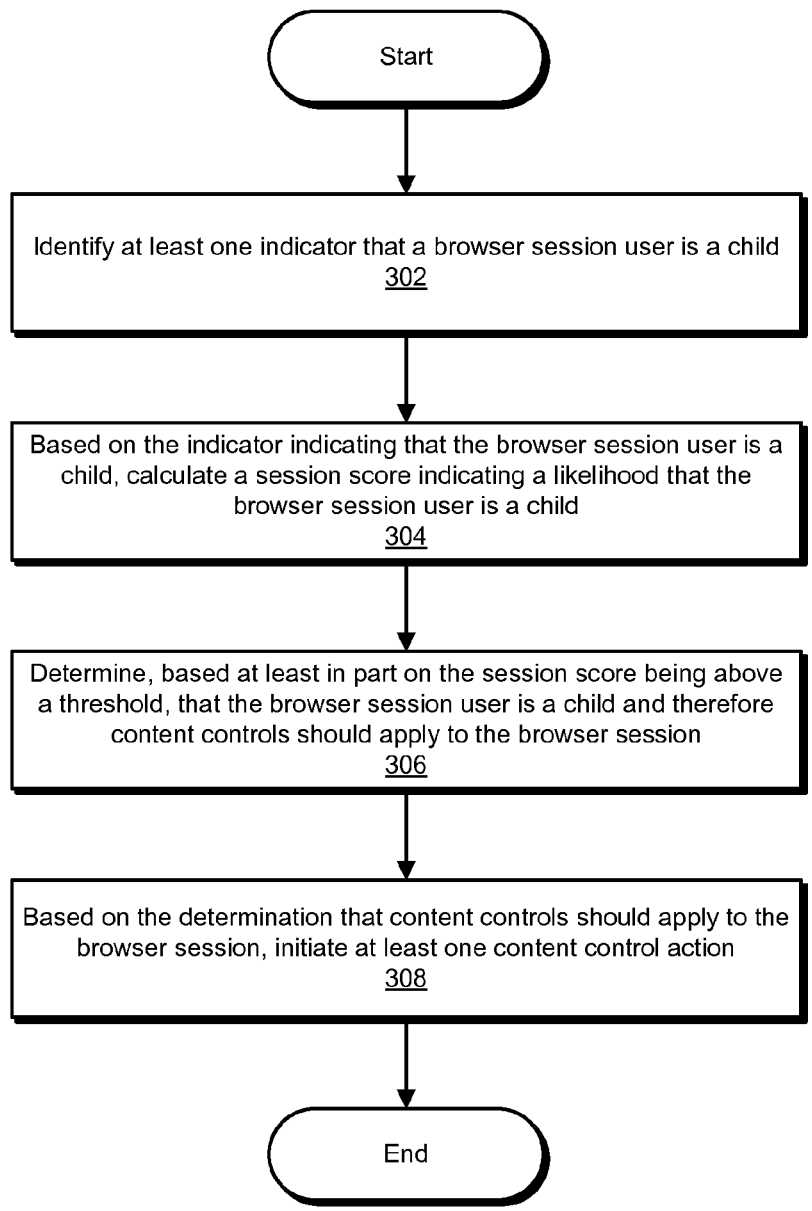
FIG. 3 is a flow diagram of an exemplary method for controlling content for child browser users.
Figure 4:
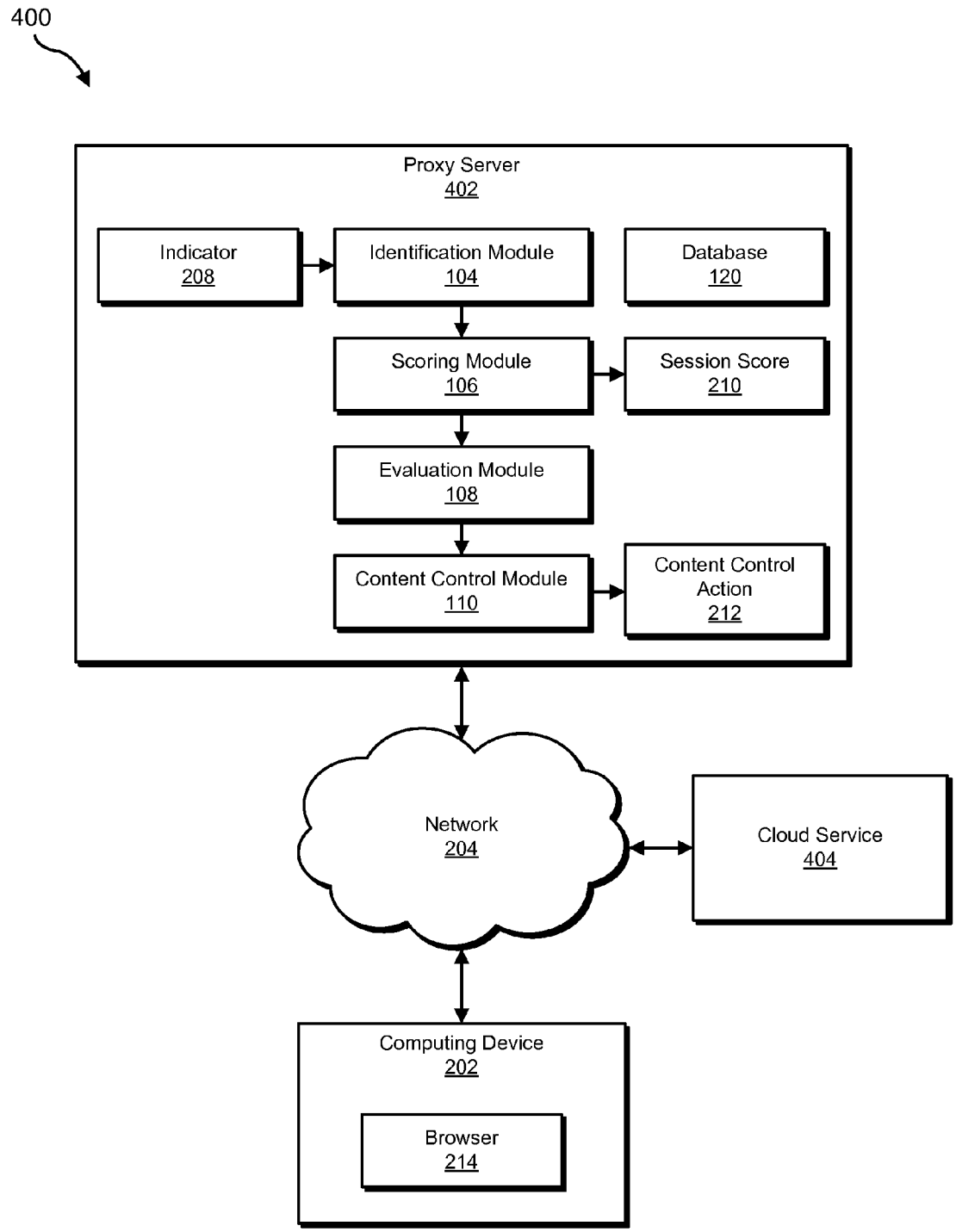
FIG. 4 is a block diagram of an exemplary system for controlling content for child browser users that includes a proxy server.

The following will provide, with reference to FIGS. 1, 2, and 4, detailed descriptions of exemplary systems for controlling content for child browser users. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for controlling content for child browser users. As illustrated in this figure, exemplary system 100 may include one or more modules 102 for performing one or more tasks. For example, and as will be explained in greater detail below, exemplary system 100 may include an identification module 104 that may identify one or more indicators that a browser session user may be a child. Exemplary system 100 may additionally include a scoring module 106 that may, based on the indicator indicating that the browser session user may be a child, calculate a session score indicating a likelihood that the browser session user may be a child. Exemplary system 100 may also include an evaluation module 108 that may determine, based at least in part on the session score being above a threshold, that the browser session user may be a child and therefore content controls should apply to a browser session of the child. Exemplary system 100 may additionally include a content control module 110 that may, based on the determination that content controls should apply to the browser session, initiate one or more content control actions. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), the devices illustrated in FIG. 4 (e.g., proxy server 402 and/or cloud service 404), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store user account information, cloud service content information, and/or content control configuration data pertaining to user accounts and/or cloud services. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of contexts. For example, system 100 may be implemented on a server of a content provider (e.g., FIG. 2) or on a proxy server run by a security provider or content provider (e.g., FIG. 4). As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. For example, server 206 may operate as part of a cloud service (e.g., server 206 may provide content or may be part of a system that provides content for the cloud service). In this example, one or more of modules 102 may detect that a user of browser 214 on computing device 202 is a child and initiate one or more content control actions 212 to ensure that content provided from the cloud service is suitable for a child.

The terms "content provider" and "content service," as used herein, generally refer to a cloud service, web service, and/or other service that provides, via a network, digital content that can be rendered by a browser for display to a user. Content services may include, without limitation, information providers, educational services, shopping or e-commerce services, social networking services, gaming services, and/or affiliation services for public or private organizations. In one example, a server of a shopping service may perform all or a portion of computer-implemented method 300 to determine that a browser user accessing the service is a child, that only products suitable for a child should be displayed to the user, and that the shopping service should obtain parental permission before completing any sales.

In another example, all or a portion of exemplary system 100 may represent portions of exemplary system 400 in FIG. 4. As shown in FIG. 4, system 400 may include a computing device 202 in communication with a proxy server 402 and a cloud service 404 via a network 204. Proxy server 402 may be programmed with one or more of modules 102 and/or may store all or a portion of the data in database 120. Proxy server 402 may route requests for information or other services from computing device 202 to cloud service 404, and replies from cloud service 404 to computing device 202. For example, identification module 104, scoring module 106, and/or evaluation module 108 executing on proxy server 402 may detect that a user of browser 214 on computing device 202 is a child accessing cloud service 404. Content control module 110 may then initiate one or more content control actions to ensure that content that proxy server 402 routes to the user from the cloud service is suitable for a child. For example, content control module 110 may direct proxy server 402 to block requests from browser 214 for content from cloud service 404 that is inappropriate for a child, modify search requests from browser 214, or filter content provided by cloud service 404 to browser 214.

In some examples, a proxy server may enable a parent to have the proxy server examine both requests for Internet content from the user and content provided by Internet sites in response to the requests. Parents using the parental control service may be permitted to specify the types of content that may be provided to a child user. For example, a proxy server may determine that a browser user accessing a gaming service is a child and that the child's parent has indicated that requests for games not suitable for a child should be blocked.

Whether implemented on a proxy server or directly as part of a cloud service, modules 102 may perform similar steps to protect children from inappropriate content. As will be explained in greater detail in the discussion corresponding to FIG. 3, one or more of modules 102 from FIG. 1 may, when executed by at least one processor of computing device 202, server 206, and/or proxy server 402, enable computing device 202, server 206, and/or proxy server 402 to control browser content for users who are children. For example, and as will be described in greater detail below, identification module 104 may identify one or more indicators 208 that a browser session user is a child. Scoring module 106 may, based on indicator 208 indicating that browser session user is a child, calculate a session score 210 indicating a likelihood that browser session user is a child. Evaluation module 108 may determine, based at least in part on session score 210 being above a threshold, that browser session user is a child and therefore content controls should apply to a browser session of the child. Content control module 110 may, based on the determination that content controls should apply to the browser session, initiate one or more content control actions 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 and proxy server 402 generally represent any type or form of computing device that is capable of storing, comparing, and/or transmitting data. Examples of server 206 and proxy server 402 include, without limitation, application servers, web servers, cloud servers, and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for controlling content for child browser users. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, computing system 510 in FIG. 5, and/or portions of exemplary network architecture 600 in FIG. 6.

At step 302, one or more of the systems described herein may identify one or more indicators that a browser session user is a child. For example, identification module 104 may, as part of server 206 in FIG. 2 or proxy server 402 in FIG. 4, identify one or more indicators 208 that a browser session user using browser 214 running on computing device 202 is a child.

Identification module 104 may identify indicators that a browser session user is a child in a variety of ways and/or a variety of contexts. For example, identification module 104 may identify the indicator that the browser session user is a child by identifying the presence of one or more parental control extensions in the browser used in the browser session. In such embodiments, the systems of the instant disclosure may supplement parental controls already present on an endpoint device (e.g., by providing parental control when a child is using a parent's account on a device).

The term "parental control extension," as used herein, generally refers to software designed to add mechanisms to a browser that enable a parent, guardian, and/or other responsible adult (e.g., a teacher or librarian) to control content the browser renders to a child user. A parental control extension, for example, may provide a password-protected interface for a parent to identify specific words or types of content that the browser should not render when the browser user is a child and a mechanism (e.g., a user name and password) that may be used to determine whether the user is a child or adult.

In one example, identification module 104 may, executing on a server of a cloud service or on a proxy server intermediating between a cloud service and a browser user, add code to content to be rendered by the browser that detects parental control extensions in the browser. For example, identification module 104 may add JavaScript code to a web page that the browser is to render that identifies installed browser extensions and determines whether one of the installed extensions is a parental control extension.

In some additional examples, identification module 104 may identify the indicator that the browser session user is a child by identifying one or more changes to a request sent to a backend server when compared to a request received by the backend server (e.g., to detected whether a parental control system is implemented as an active communication channel monitor on the computing device on which the browser is executing). Identification module 104 may detect the presence of an active communication channel monitor by identifying changes (such as changes to fields in the request header or in the order of fields in the request header) to requests sent to a backend server.

Identification module 104 may, executing on server 206 in FIG. 2 or proxy server 402 in FIG. 4, identify indicator 208 that the user of browser 214 on computing device 202 may be a child by inserting code in content provided by server 206 or cloud service 404 that requests content from a backend server (not shown in FIG. 2 or 4). Identification module 104 may compare the request sent to the backend server with the request received by the backend server to detect changes made to the request. Any changes detected may indicate the presence of a communication channel monitoring system that may implement parental controls on the communication channel.

Identification module 104 may detect changes in requested content in a variety of ways. For example, the backend server may have prior knowledge of the request to be sent and therefore be able to recognize any changes in the request received. In another example, the backend server may send a copy of the received request to identification module 104 executing on server 206 or proxy server 402 to compare to the request that was to be sent by browser 214 on computing device 202.

In another example, identification module 104 may determine that parental controls in the form of a content monitor may be present on the communication channel of the computing device by comparing the time to transmit a simple form versus a complex form. A content monitor that parses form data may require more time to parse a complex form with many elements than a simple form with just a few elements. In this example, identification module 104 may identify the indicator that the browser session user is a child by: (1) comparing a time to transmit a first form with a time to transmit a second form that includes the same quantity of data as the first form, where the first form includes more user interface elements than the second form, (2) determining that the time to transmit the first form is greater than the time to transmit the second form, and (3) in response to determining that the time to transmit the first form is greater than the time to transmit the second form, determining that a content monitor that parses the first and second forms is likely present.

For example, identification module 104, executing on server 206 in FIG. 2 or proxy server 402 in FIG. 4, may identify indicator 208 that the user of browser 214 on computing device 202 may be a child by comparing the time required to transmit two forms containing the same amount of data, but with one form including more user interface elements (e.g., text fields, check boxes, radio buttons, drop-down menus, combo boxes, etc.) than the other. Identification module 104 may determine the time required to transmit a form by comparing the timestamp in the form's request header to the time the form is received at server 206 or proxy server 402. If the form containing more user interface elements takes longer to transmit to a server than the form with fewer elements, then identification module 104 may determine that a content monitor that parses the content of the forms is likely present on the communication channel. A content monitor may be present as part of a parental control system, which may indicate that the browser user is a child.

In some examples, identification module 104 may determine that parental controls are modifying content displayed to a child user by rendering content inappropriate for a child in a manner invisible to the user and detecting whether the content is modified before it is rendered. For example, identification module 104 may identify the indicator that the browser session user is a child by (1) rendering content during the browser session in a manner invisible to the browser session user, (2) detecting one or more changes to the rendered content, and (3) in response to detecting the change, determining that a parental control is likely controlling content rendered during the browser session. For example, identification module 104, executing on server 206 in FIG. 2 or proxy server 402 in FIG. 4, may identify indicator 208 that the user of browser 214 on computing device 202 is a child by inserting code in content to be rendered by browser 214 on computing device 202. Identification module 104 may also insert code that analyzes the content when rendered by browser 214 to determine whether the content is changed at the time it is rendered. For example, the change to rendered content may include removal of an offensive word and/or blocking content requested from a domain known to contain adult content.

Identification module 104 may cause a browser to render content invisible to the browser user in a variety of ways. For example, identification module 104 may insert code in content to be rendered by a browser that displays an image in part of a browser page that is not displayed. In another example, the inserted code may modify the color and/or size of an image to be displayed in a way that causes the rendered image to be invisible to the user. If identification module 104 detects a change to the rendered content, identification module 104 may determine that a parental control is likely present and may be controlling how browser 214 renders content on computing device 202. In this way, identification module 104 may identify parental controls that are not implemented as browser extensions, or parental control browser extensions that may not have been detected by other mechanisms.

Identification module 104 may also identify a variety of other indicators that a user during a browser session is a child. In some embodiments, identification module may evaluate input received from the user to determine whether the user may be a child. For example, identification module may evaluate spelling of search requests or other input (e.g., poor or phonetic-based spelling may be an indicator that a user is a child), content accessed during the session (e.g., if most of the content accessed during a session is content designed for children, this may be an indicator that a user is a child), or any other type of input to conclude that a user may be a child.

At step 304, one or more of the systems described herein may, based on the indicator indicating that the browser session user may be a child, calculate a session score indicating a likelihood that the browser session user is a child. For example, scoring module 106 may, as part of server 206 in FIG. 2 or proxy server 402 in FIG. 4, based on one or more indicators 208 indicating that the browser session user of browser 214 on computing device 202 is a child, calculate session score 210 indicating a likelihood that the browser session user is a child.

The term "session score," as used herein, generally refers to any value (e.g., numerical value, text value, etc.), set of values, or other information that may represent one or more detected indicators that a browser session user is a child. For example, a session score may be expressed as a percentage that represents a probability that the browser session user is a child. Additionally or alternatively, a session score may provide information that identifies the indicator (or indicators) identified during step 302.

Scoring module 106 may calculate a session score in a variety of ways. For example, scoring module 106 may assign a weight to each indicator 208 that identification module 104 identifies that indicate that the browser session user is a child. For each indicator identification module 104 identifies, scoring module 106 may add the weighting value to the session score, then divide the session score by the sum of all possible weighting values to obtain a percentage probability that the browser session user is a child. In another example, scoring module may consider detected combinations of indicators. For example, scoring module may utilize two methods for identifying the presence of parental control browser extensions and add a value to the session score if either method detects the presence of parental control extensions, but no additional value if parental control extensions are detected using both methods. As another example, scoring module 106 may calculate a session score by compiling information (e.g., data strings, data values, etc.) that identifies which indicator (or indicators) were noted during step 302.

Scoring module 106 may use any number of indicators to calculate a session score. In some embodiments, scoring module 106 may use a single indicator to calculate a session score. In this example, the session score may be based on the strength of the indicator and/or may indicate the presence of a particular indicator. If a single indicator strongly indicates that a user is a child, scoring module 106 may rely on that indicator alone to calculate a session score (in this example, the session score may simply indicate the presence of the indicator). In other examples, if an indicator is a weak indicator of a user being a child, scoring module 106 may use one or more additional indicators in addition to the weak indicator to calculate the session score. For instance, the presence of a parental control browser plug-in may be a weak indicator (e.g., presence of a plug-in does not necessarily indicate that it is actually active), but this in combination with other indicators (such as active changes to posted data) may provide a more useful session score for determining whether a user is a child.

At step 306, one or more of the systems described herein may determine, based at least in part on the session score being above a threshold, that the browser session user is a child and therefore content controls should apply to a browser session of the child. For example, evaluation module 108 may, as part of server 206 in FIG. 2 or proxy server 402 in FIG. 4, determine, based at least in part on session score 210 being above a threshold, that the browser session user of browser 214 on computing device 202 is a child and therefore content controls should apply to the child's browser session. The term "threshold," as used herein, generally refers to any type or form of value, percentage, or point of comparison useful for determining whether a session score is strong enough to establish a conclusion that a browser user during a browser session is a child.

Evaluation module 108 may determine that the session score is above a threshold in a variety of ways. For example, evaluation module 108 may determine that a session score is above a predetermined percentage or numerical value and that, as a result, content controls should apply to the user session. As another example, evaluation module 108 may determine whether a session score is above a threshold by determining whether a particular indicator (or combination of indicators) were identified during the browser session. In this example, rather than being a numerical value, the threshold may simply indicate which indicators (or combination of indicators) should trigger application of content controls to a browser session.

The threshold may be established in a variety of ways. For example, a content provider may set threshold values or data points. In other examples, the threshold may be set by a parental control service provider (e.g., a provider that operates a proxy server that implements content control) or by a parent via a user interface provided by a content provider or parental control service provider.

At step 308, one or more of the systems described herein may, based on the determination that content controls should apply to the browser session, initiate one or more content control actions. For example, content control module 110 may, as part of server 206 in FIG. 2 or proxy server 402 in FIG. 4, based on the determination that content controls should apply to the browser session, initiate one or more content control actions 212 that apply to browser 214 on computing device 202. The term "content control," as used herein, generally refers to mechanisms that control content a browser renders or displays.

Content control module 110 may initiate content controls in a variety of ways and/or a variety of contexts. For example, content control module 110 may, as part of a content service, modify a setting for the browser session indicating that the browser user is a child and that the content service should provide only content appropriate for a child. In another example, content control module 110 may, as part of a proxy server, apply content control rules previously established by a parent or other adult responsible for the child browser user.

In some examples, control module 110 may initiate a content control action that modifies terms in search requests entered by the browser to block requests for inappropriate content or to clarify ambiguous search terms that may mistakenly direct the user to inappropriate content. In another example, content control module 110 may modify content delivered during the browser session, such as blocking certain categories of content or modifying words or images to be rendered by the browser. In another example, content control module 110 may entirely block browser use during periods of time specified by a parent or other adult on behalf of a child browser user.

Content control actions may be defined and established in a variety of ways. For example, a cloud service may initiate a default set of content control actions when the service determines that a user is likely a child. Likewise, a parental control service of a security service provider may initiate a set of content control actions when the service determines that a user is likely a child. In another example, a cloud service or security service provider may provide a user interface that allows a child's parent or guardian to specify which content control actions are to be taken when one of the services determines that a browser user is likely a child.

As described above, systems and methods described herein may control content for child browser users by detecting indicators that the browser user is a child, evaluating the indicators to determine the likelihood that the browser user is a child, and, if the likelihood that the user is a child is above a threshold, initiate content control actions that may assert control over content displayed by the browser. Systems and methods described herein may detect a variety of indicators that the browser session user is a child, including indicators that parental control extensions are present in the browser, that monitoring software is present on the communication channel, and/or that content controls that may not be detected directly are modifying content rendered by the browser.

Figure 5:
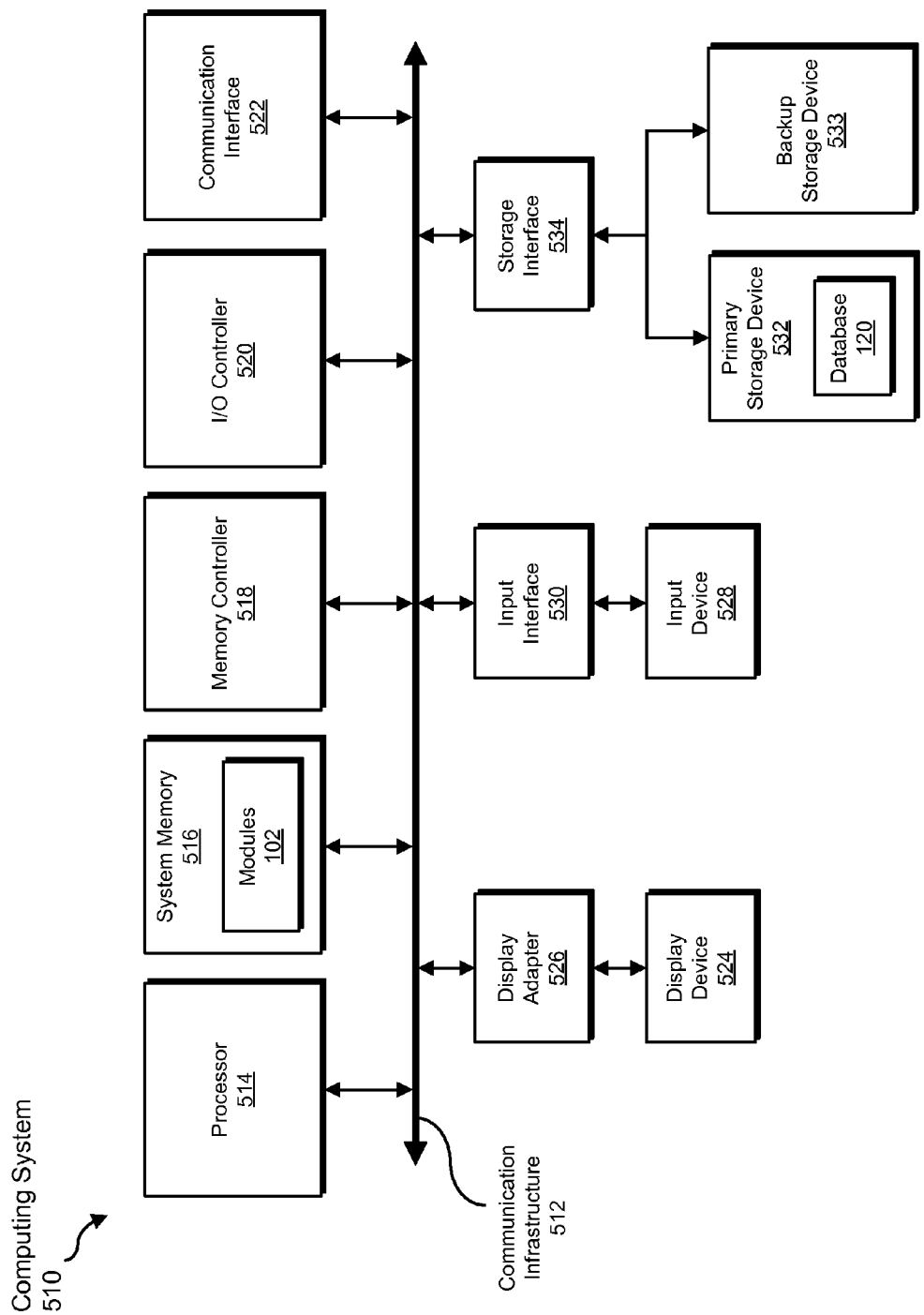
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
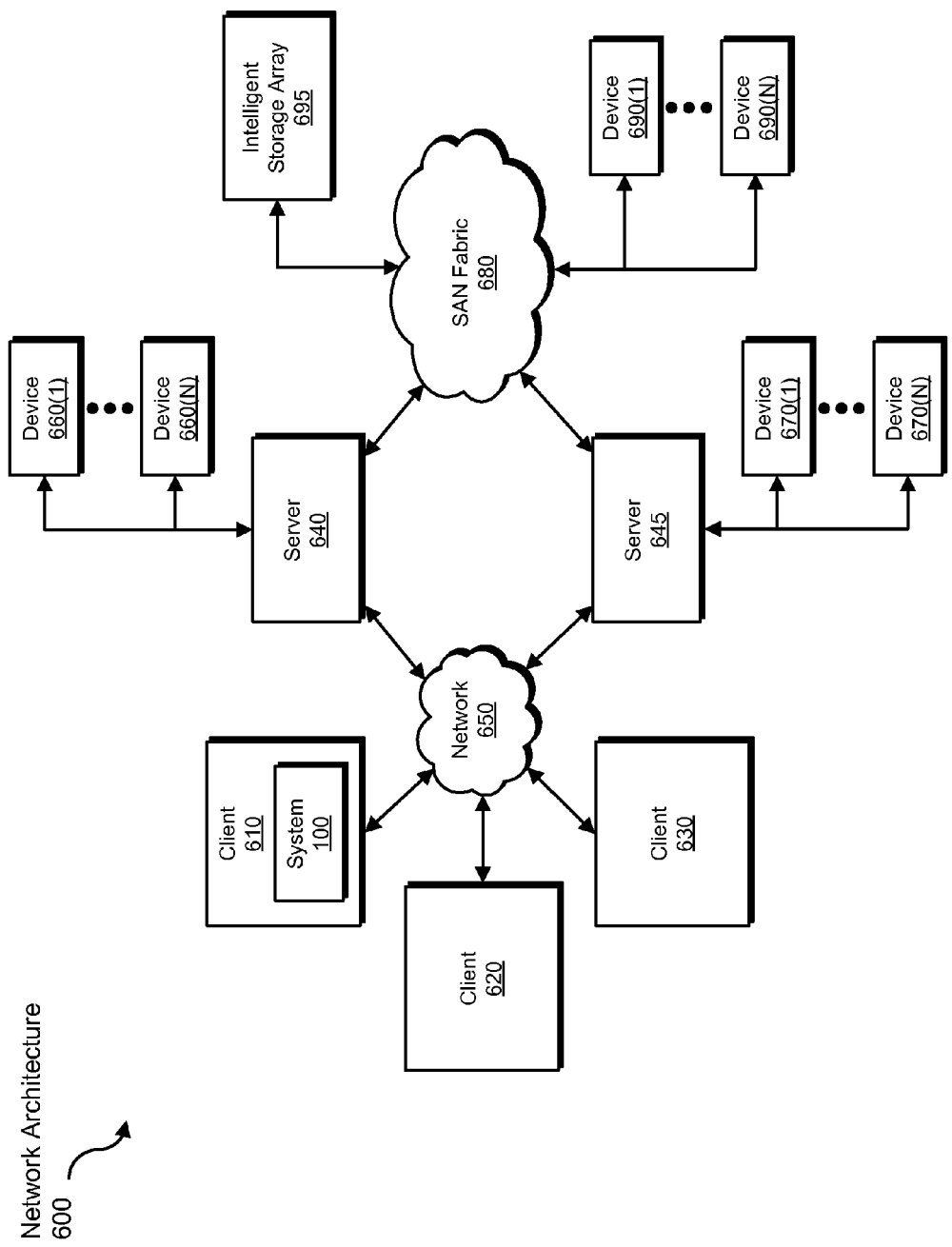
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for controlling content for child browser users.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive one or more indicators indicating that a browser session user is a child to be transformed, transform the indicators, output a result of the transformation to calculate a session score indicating the likelihood that the browser session user is a child, use the result of the transformation to determine that the browser session user is a child, and store the result of the transformation to select a content control action to initiate. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling content for child browser users, at least a portion of the method being performed by a computing device comprising at least one processor, the method comprising:

identifying at least one indicator that a browser session user is a child;

based on the indicator indicating that the browser session user is a child, calculating a session score indicating a likelihood that the browser session user is a child;

determining, based at least in part on the session score being above a threshold, that the browser session user is a child and therefore content controls are configured to apply to a browser session of the child;

based on the determination that content controls are configured to apply to the browser session, initiating at least one content control action.

2. The computer-implemented method of claim 1, wherein the computing device that performs the portion of the computer-implemented method comprises a server of a content service.

3. The computer-implemented method of claim 1, wherein the computing device that performs the portion of the computer-implemented method comprises a proxy server that relays communications between at least one client and a content service.

4. The computer-implemented method of claim 1, wherein identifying the indicator that the browser session user is a child comprises identifying at least one change to a request sent to a backend server when compared to a request received by the backend server.

5. The computer-implemented method of claim 1, wherein identifying the indicator that the browser session user is a child comprises:

comparing a time to transmit a first form with a time to transmit a second form comprising the same quantity of data as the first form, wherein the first form comprises more user interface elements than the second form;

determining that the time to transmit the first form is greater than the time to transmit the second form;

in response to determining that the time to transmit the first form is greater than the time to transmit the second form, determining that a content monitor that parses the first and second forms is likely present.

6. The computer-implemented method of claim 1, wherein identifying the indicator that the browser session user is a child comprises identifying a presence of at least one parental control extension in a browser used in the browser session.

7. The computer-implemented method of claim 1, wherein identifying the indicator that the browser session user is a child comprises:
rendering content during the browser session in a manner invisible to the browser session user;
detecting at least one change to the rendered content;
in response to detecting the change, determining that a parental control is likely controlling content rendered during the browser session.

8. The computer-implemented method of claim 7, wherein the change to rendered content comprises at least one of:
removal of an offensive word;
blocking content requested from a domain known to contain adult content.

9. The computer-implemented method of claim 1, wherein the content control action comprises at least one of:
modifying terms in search requests received during the browser session;
modifying content delivered during the browser session.

10. A system for controlling content for child browser users, the system comprising:
an identification module, stored in memory, that identifies at least one indicator that a browser session user is a child;
a scoring module, stored in memory, that, based on the indicator indicating that the browser session user is a child, calculates a session score indicating a likelihood that the browser session user is a child;
an evaluation module, stored in memory, that determines, based at least in part on the session score being above a threshold, that the browser session user is a child and therefore content controls are configured to apply to a browser session of the child;
a content control module, stored in memory, that, based on the determination that content controls are configured to apply to the browser session, initiates at least one content control action;
at least one physical processor configured to execute the identification module, the scoring module, the evaluation module, and the content control module.

11. The system of claim 10, wherein the system comprises a server of a content service.

12. The system of claim 10, wherein the system comprises a proxy server that relays communications between at least one client and a content service.

13. The system of claim 10, wherein the identification module identifies the indicator that the browser session user is a child by identifying at least one change to a request sent to a backend server when compared to a request received by the backend server.

14. The system of claim 10, wherein the identification module identifies the indicator that the browser session user is a child by:
comparing a time to transmit a first form with a time to transmit a second form comprising the same quantity of data as the first form, wherein the first form comprises more user interface elements and the second form comprises fewer user interface elements;
determining that the time to transmit the first form is greater than the time to transmit the second form;
in response to determining that the time to transmit the first form is greater than the time to transmit the second form, determining that a content monitor that parses the first and second forms is likely present.

15. The system of claim 10, wherein the identification module identifies the indicator that the browser session user is a child by identifying a presence of at least one parental control extension in a browser used in the browser session.

16. The system of claim 10, wherein the identification module identifies the indicator that the browser session user is a child by:
rendering content during the browser session in a manner invisible to the browser session user;
detecting at least one change to the rendered content;
in response to detecting the change, determining that a parental control is likely controlling content rendered during the browser session.

17. The system of claim 16, wherein the change to rendered content comprises at least one of:
removal of an offensive word;
blocking content requested from a domain known to contain adult content.

18. The system of claim 10, wherein the content control action comprises at least one of:
modifying terms in search requests received during the browser session;
modifying content delivered during the browser session.

19. A non-transitory computer-readable medium comprising one or more computer-readable instructions that, when executed by at least one processor of a computing device, cause the computing device to:
identify at least one indicator that a browser session user is a child;
based on the indicator indicating that the browser session user is a child, calculate a session score indicating a likelihood that the browser session user is a child;
determine, based at least in part on the session score being above a threshold, that the browser session user is a child and therefore content controls are configured to apply to a browser session of the child;
based on the determination that content controls are configured to apply to the browser session initiate at least one content control action.

20. The non-transitory computer-readable medium of claim 19, wherein the computing device that executes the one or more computer-readable instructions comprises a server of a content service.

* * * * *